US010934015B2

(12) United States Patent
Park (10) Patent No.: US 10,934,015 B2
(45) Date of Patent: Mar. 2, 2021

(54) FLIGHT INFORMATION STORAGE SYSTEM AND METHOD OF MANAGING SAME FOR AIRPLANE (71) Applicants: STARNEX CO., LTD., Seoul (KR); Sang-Rae Park, Seoul (KR)

(72) Inventor: Sang-Rae Park, Seoul (KR)

(73) Assignees: STARNEX CO., LTD., Seoul (KR); Sang-Rae Park, Seoul (KR)

( * ) Notice: Subject to any disclaimer, the term of this patent is extended or adjusted under 35 U.S.C. 154(b) by 180 days.

(21) Appl. No.: 15/500,383

(22) PCT Filed: Jul. 22, 2015

(86) PCT No.: PCT/KR2015/007588
§ 371 (c)(1),
(2) Date: Jan. 30, 2017

(87) PCT Pub. No.: WO2016/017984
PCT Pub. Date: Feb. 4, 2016

(65) Prior Publication Data
US 2017/0217601 A1 Aug. 3, 2017

(30) Foreign Application Priority Data
Jul. 31, 2014 (KR) .................. 10-2014-0098113

(51) Int. Cl.
B64D 43/00 (2006.01)
B64D 47/08 (2006.01)
(Continued)

(52) U.S. Cl.
CPC ............ B64D 43/00 (2013.01); B64D 47/08 (2013.01); G01D 9/00 (2013.01); G01S 13/89 (2013.01);
(Continued)

(58) Field of Classification Search
CPC .. B64D 7/00; B64D 47/08; B64D 2045/0065; G07C 5/0841; H04N 7/18
See application file for complete search history.

(56) References Cited

U.S. PATENT DOCUMENTS 4,636,858 A    1/1987  Hague et al.
5,283,643 A *  2/1994  Fujimoto ............... B64D 45/00
                                                        340/973

(Continued)

FOREIGN PATENT DOCUMENTS

EP         1 419 946 A1      5/2004
KR   10-2005-0107958 A      11/2005
(Continued)

OTHER PUBLICATIONS

European Search Report dated Feb. 9, 2018 in counterpart European Application No. 15826718.7 (10 pages in English).
(Continued)

Primary Examiner — Jeremiah C Hallenbeck-Huber
(74) Attorney, Agent, or Firm — NSIP Law (57) ABSTRACT A flight information storage system for an airplane according to the present invention may include: one or more of a video acquiring device mounted on the airplane; a recording device for recording video acquired through the video acquiring device(s) during a flight of the airplane; and a travel storage device which simultaneously stores the video data recorded by the recording device. Here, the travel storage device may be a USB cartridge, and the video acquiring device may be one or both of a digital camera and a radar device. The digital camera may include a first digital camera that is installed in front of the cockpit of the airplane to capture an image to the front of the airplane during flight, and two or more second digital cameras installed behind the cockpit of the airplane to capture an image of the instrument (Continued)

panel of the airplane and the area surrounding the instrument panel.

11 Claims, 7 Drawing Sheets

(51) Int. Cl.
  *G01D 9/00* (2006.01)
  *G01S 13/89* (2006.01)
  *G06K 9/00* (2006.01)
  *G07C 5/08* (2006.01)
  *H04N 5/907* (2006.01)
  *H04N 7/18* (2006.01)

(52) U.S. Cl.
  CPC ......... *G06K 9/0063* (2013.01); *G07C 5/0841* (2013.01); *H04N 5/907* (2013.01); *H04N 7/181* (2013.01)

(56) References Cited

U.S. PATENT DOCUMENTS

| | | | | |
|---|---|---|---|---|
| 5,432,546 | A * | 7/1995 | Cargill | H04N 7/18 244/1 TD |
| 6,915,190 | B2 * | 7/2005 | Galasso | B64D 45/00 348/117 |
| 7,283,156 | B1 * | 10/2007 | Morgan | F41G 7/001 340/539.26 |
| 7,640,083 | B2 * | 12/2009 | Monroe | B64D 45/0015 244/194 |
| 2002/0004695 | A1 * | 1/2002 | Glenn | G07C 5/0891 701/32.2 |
| 2003/0152145 | A1 * | 8/2003 | Kawakita | H04N 5/77 375/240.12 |
| 2004/0095466 | A1 | 5/2004 | Galasso | |
| 2004/0160340 | A1 * | 8/2004 | Thomson | B64D 45/0015 340/945 |
| 2005/0116098 | A1 * | 6/2005 | Martens | B64C 1/1469 244/118.5 |
| 2006/0159164 | A1 * | 7/2006 | Finizio | B64D 45/0015 375/240.01 |
| 2011/0054721 | A1 * | 3/2011 | Goodrich | G05B 23/0283 701/14 |
| 2012/0259508 | A1 * | 10/2012 | O'Connor | G01C 23/00 701/33.4 |
| 2012/0316724 | A1 * | 12/2012 | Verlut | G05D 1/102 701/25 |
| 2013/0278772 | A1 | 10/2013 | Yun | |

FOREIGN PATENT DOCUMENTS

| | | |
|---|---|---|
| KR | 10-2008-0035720 A | 4/2008 |
| KR | 10-1349148 B1 | 1/2014 |
| WO | WO 01/60693 A2 | 8/2001 |
| WO | WO 01/060693 A3 | 8/2001 |
| WO | WO 2011/067419 A1 | 6/2011 |
| WO | WO 2013/164813 A1 | 11/2013 |

OTHER PUBLICATIONS

Korean Office Action dated Oct. 7, 2014 in corresponding Korean Patent Application No. 10-2014-0098113 (4 pages in Korean).
Chinese Office Action dated Oct. 19, 2018 in corresponding Chinese Patent Application No. 201580040751.9 (3 pages in Chinese).
Japanese Office Action dated Apr. 16, 2019 in corresponding Japanese Patent Application No. 2017-526470 (4 pages in English, 6 pages in Japanese).

* cited by examiner

☐ FRONT CAMERA (ONE)

▨ CAMERA FOR TAKING
IMAGE OF INSTRUMENT
PANEL (TWO)

FLIGHT INFORMATION STORAGE SYSTEM AND METHOD OF MANAGING SAME FOR AIRPLANE

CROSS REFERENCE TO RELATED APPLICATIONS

This application is the National Phase of PCT International Application No. PCT/KR2015/007588, filed on Jul. 22, 2015, which claims priority under 35 U.S.C. 119(a) to Patent Application No. 10-2014-0098113, filed in the Republic of Korea on Jul. 31, 2014, all of which are hereby expressly incorporated by reference into the present application.

TECHNICAL FIELD

The present invention relates an aviation information storage system for an aircraft and a method of operating the same, for example, an aviation information storage system for an aircraft and a method of operating the same capable of synchronously storing various pieces of information generated during a flying process of the aircraft in two storage devices to increase safety of retaining data and simultaneously instantaneously checking the pieces of information recorded as described above through exclusive debriefing solution equipment, thereby increasing a security function and maximizing safety of the various pieces of information generated during the flying process of aircraft. Through this, a black box system with a very excellent data protection function may be provided to an aircraft and simultaneously the system and method may be used for a flying training system for not only pilots for operating combat planes but also pilots for operating various types of aircrafts such as cargo planes, passenger planes and the like.

BACKGROUND ART

Generally, a lot of time and costs are necessary for training outstanding pilots. For example, based on air-force pilots in Korea, according to press releases, it has been checked that considerable expenses from several billion to ten million Korean won are paid depending on types of fighter planes.

Also, even though pilots are trained at enormous expense as described above, since it is impossible to neglect training of pilots who are core combat crews for national security, a technology of minimizing expenses of training of pilots has been very much needed.

For example, in flying training of pilots, general flying training aircrafts are used. In a flying training process, communication means between pilot trainees boarding general flying training aircrafts and a central control center should be provided and also a process of thoroughly analyzing and estimating flying data for each pilot trainee after flying is necessary.

Accordingly, the present invention was derived and suggested during a process of studying a method of effectively performing this and simultaneously increasing a learning effect of flying training for each pilot trainee during this process.

Meanwhile, as aviation technology has develops, applied industry using aircrafts has also been various developed. In other words, in addition to the purpose of national defense, since the trade and distribution and transportation amounts between countries largely increase, various types of large aircrafts have been developed and operated and use of aircrafts in reconnaissance, exploration, environments, leisure and the like has gradually been increased. Accordingly, it is expected that demand of pilots of aircrafts are continuously increased.

Accordingly, as described above, since demands for flying training of not only pilots for military fighter planes but also pilots for cargo planes and passenger planes and the like are increased, a flying training system is very much needed for this.

Also, a black box system for more stably storing an entire situation or an instantaneous situation of an accident such as a crash, an emergency landing or the like of an aircraft is necessary. That is, in a crash of an aircraft, a black box thereof is severely damaged or lost in such a way that accidental images of a corresponding accident are not secured. Accordingly, a method for solving the same is necessary.

DISCLOSURE OF INVENTION

Technical Problem

The present invention provides an aviation information storage system for an aircraft and a method capable of dually storing various pieces of information generated during a flying process of the aircraft and simultaneously instantaneously checking the pieces of information recorded as described above through exclusive debriefing solution equipment, thereby increasing a security function and maximizing safety of the various pieces of information generated during the flying process of aircraft. Through this, a black box system with a very excellent data protection function may be provided to an aircraft and simultaneously the system and method may be used for a flying training system for not only pilots for operating combat planes but also pilots for operating various types of aircrafts such as cargo planes, passenger planes and the like.

The present invention provides an aviation information storage system for an aircraft and a method of operating the same capable of, when an event situation such as firing of a machine gun, a missile and the like occurs during a flying process, storing image information of a corresponding event process as a separate image file and simultaneously with synchronizing and storing related data based on an operation of devices of the aircraft and body motion of a pilot for a corresponding event with the separately stored image file to be displayed in one screen in regeneration thereof and used as materials necessary for flying training to increase effects of the flying training.

The present invention also provides an aviation information storage system for an aircraft and a method of operating the same capable of, when an event situation such as firing of a machine gun, a missile and the like occurs during a flying process of an aircraft, obtaining body motions for a corresponding event in this process as images in real time and displaying the images obtained as described above in real time in at least one place of the inside of the aircraft and a control center to be directly utilized for flying training of the corresponding flying.

The present invention also provides an aviation information storage system and a method of operating the same capable of integrating a forward image, a radar image, other directional images in addition to the front, and an internal image of a cockpit of an aircraft that occur during a flying process of the aircraft into one image to store and simultaneously including a function of selecting the number of types of images capable of being integrated and stored in one image, that is, the number of types of images that will be integrated and stored is preset before the beginning of flying.

Technical Solution

One aspect of the present invention provides an aviation information storage system for an aircraft, including one or more image obtaining devices mounted in the aircraft, a recording device configured to record images obtained through the image obtaining devices during a flying process of the aircraft, and a portable storage device configured to synchronously store image data recorded by the recording device. Here, the portable storage device may be a universal serial bus (USB) cartridge.

The image obtaining device may be one or both a digital camera and a radar device. Here, the digital camera may include a first digital camera installed in front of a cockpit of the aircraft to take an image of the front of the aircraft that is flying and two or more digital cameras installed in the rear of the cockpit of the aircraft to take images of an instrument panel of the aircraft and surroundings thereof.

Also, the system may further include an event signal generator configured to be connected to equipment of an instrument panel that generates an event and to generate a trigger signal when an event situation is generated by operating the instrument panel during a flying process of the aircraft. Also, when the trigger signal is received, the recording device may synchronize data related to the corresponding event with a corresponding event image to display the data related to the event in a certain area of the corresponding event image that is record or display in real time or the corresponding event image that is recorded and then regenerated. Here, the aircraft may be a military aircraft, the event signal generator may be connected to offensive military equipment of the aircraft and may generate a trigger signal when the corresponding offensive military equipment is operated, and data related to an event, generated by the recording device, may be data for displaying an operation time of a pilot with respect to the corresponding offensive military equipment during the corresponding operation in ms ($1/1000$ second) when the offensive military equipment is operated.

When the trigger signal is input from the event signal generator, the recording device may insert a beginning code and a completion code into an image obtained for a time preset for each type of the trigger signal, and the recording device may further store an event image distinguished by the beginning code and the completion code as a separate file.

The recording device may be loaded with a recording program capable of dividedly displaying images obtained through two or more obtaining devices and simultaneously transmitted on one screen and simultaneously displaying only one image selected as necessary and a regeneration program capable of displaying one image selected from the images dividedly displayed on one screen on overall screen.

The system may further include a monitor installed inside the aircraft to display the images obtained by the image obtaining devices. The monitor may be connected to an electrical connection line of the image obtaining devices and the recording device in parallel and may include a function of regenerating the images obtained by the image obtaining devices in real time or a function of regenerating the image data stored in the recording device or the portable storage device.

Another aspect of the present invention provides a method of storing aviation information for an aircraft, including obtaining images for each of a plurality of image obtaining devices mounted in the aircraft while the aircraft is flying, recording, by a recording device, the images obtained for each of the image obtaining devices, and synchronously store image data recorded through the recording device in a portable storage device.

The obtaining of the images for each of the plurality of image obtaining devices mounted in the aircraft may include generating and transmitting, by an event signal generator connected to pieces of equipment of an instrument panel of the aircraft when an event situation is generated by operating the instrument panel, a trigger signal for each of the pieces of equipment of the instrument panel that generates an event, to the recording device and generating, by the recording device, data related to the corresponding event according to reception of the trigger signal and then synchronizing the generated data with an corresponding event image to record together by the recording device.

The generating and transmitting, by the event signal generator connected to the pieces of equipment of the instrument panel of the aircraft when the event situation is generated by operating the instrument panel, the trigger signal for each of the pieces of equipment of the instrument panel that generates the event to the recording device may include operating a corresponding piece of operation equipment of the instrument panel to perform an offensive military function of offensive military equipment of a the aircraft that is a fighter plane, generating, by the event signal generator connected to the corresponding piece of equipment, the trigger signal when operating the operation equipment of the instrument panel for operating the offensive military equipment, generating, by the recording device that receives the trigger signal, data for visually displaying an operation time of a pilot with respect to the corresponding offensive military equipment in ms ($1/1000$ second) based on one time operation of the offensive military equipment, and synchronizing the data for visually displaying in ms ($1/1000$ second), generated by the recording device, with a corresponding event image to transmit to the recording device.

The obtaining of the images for each of the plurality of image obtaining devices mounted in the aircraft while the aircraft is flying may include inserting, by the recording device, a beginning code and a completion code into an image obtained for a preset time when the trigger signal is input from the event signal generator, and the recording, by the recording device, the images obtained for each of the image obtaining devices may include storing an event image distinguished according to the beginning code and the completion code as a separate file.

The recording of the images obtained for each of the image obtaining device by the recording device may include selecting one image obtaining device among the image obtaining devices to dividedly display the obtained images with images of the other image obtaining devices, recording images obtained by the selected image obtaining device among the image obtaining devices and simultaneously transmitted to the recording device to be dividedly displayed in one screen, and outputting image data recorded to be dividedly displayed based on one screen by the recording device to regenerate only one image selected during a regeneration process while being enlarged to an overall screen.

Advantageous Effects

According to the embodiments of the present invention, various pieces of information generated during an operation process of the aircraft may be dually stored and the pieces of information recorded as described above may be simultaneously instantaneously check through exclusive debriefing solution equipment, thereby increasing a security function and maximizing safety of the various pieces of information generated during the flying process of aircraft. Through this, a black box system with an excellent data protection function may be provided to an aircraft and simultaneously a flying training system may be provided for not only pilots for operating combat planes but also pilots for operating various types of aircrafts such as cargo planes, passenger planes and the like.

Also, when an event situation such as firing of a machine gun, a missile and the like occurs during a flying process, image information of a corresponding event process may be stored as a separate image file and simultaneously related data based on an operation of devices of the aircraft and body motion of a pilot for a corresponding event may be synchronized with the separately stored image file and stored to be displayed in one screen in regeneration thereof and used as materials necessary for flying training to increase effects of the flying training.

For example, in case of fighter planes, a machine gun operation time, a missile switch pulling time and the like for each firing of a machine gun or missile may be displayed in ms (1/1000 second) over an image of the event image data and may be used as materials for improving a skill level, an instantaneous response operation and the like of a pilot to increase efficiency of flying training.

Also, when an event situation such as firing of a machine gun, a missile and the like occurs during a flying process of an aircraft, body motions for a corresponding event in this process may be obtained as images in real time and the images obtained as described above may be displayed in real time in at least one place of the inside of the aircraft and a control center to be directly utilized for flying training of the corresponding flying.

Also, a forward image, a radar image, images in other directions in addition to the front, and an internal image of a cockpit of an aircraft that may be generated during a flying process of the aircraft may be integrated into one image to be stored and simultaneously the number of types of images capable of being integrated and stored in one image may be selected, that is, the number of types of images that will be integrated and stored may be preset before the beginning of flying in such a way that image data may be efficiently obtained and simultaneously stored during a flying process.

BEST MODE FOR INVENTION

The following detailed descriptions of the present invention are embodiments for executing the present invention and refer to the attached drawings that illustrate examples of corresponding embodiments. The embodiments will be described in detail to be adequate for allowing one of ordinary skill in the art to execute the present invention. It should be understood that various embodiments of the present invention may be different from one another but are not mutually exclusive. For example, with respect to one embodiment, particular shapes, structures, and features disclosed herein may be embodied as another embodiment without departing from the concept and scope of the present invention. Also, it should be understood that positions or arrangements of respective components in each of the disclosed embodiments of the present invention may be modified without departing from the concept and scope of the present invention.

Accordingly, the following detailed descriptions do not have limitative meanings. When the scope of the present invention is adequately described, it is defined by only the attached claims and equivalents thereof. Throughout the drawings, like reference numerals refer to like or similar functions in various aspects.

Although terms generally used now are selected for the terms used herein considering functions in the present invention, these may vary according to intentions of one of ordinary skill in the art, practices, the advent of new technology and the like. Also, in particular cases, terms randomly selected by (an) applicant(s) are present. In this case, meanings thereof will be described in detail in sections of a description of the present invention corresponding thereto. Accordingly, the terms used herein should be defined, not as simple designations of the terms, based on the meanings of the terms and the content throughout the present invention.

Throughout the specification, when it is described that a portion "includes" an element, unless particularly defined otherwise, it means that the portion does not exclude other elements but may further include other elements. Also, the terms "portion", "module", and the like disclosed herein mean units each configured to perform at least one function or operation and may be embodied as hardware, software, or a combination of hardware and software.

Referring to FIGS. 1 to 7, an aviation information storage system for an aircraft and a method of operating the same according to one embodiment of the present invention will be described.

First, referring to FIGS. 1 to 3, the aviation information storage system for the aircraft according to one embodiment of the present invention will be described.

Figure 1:
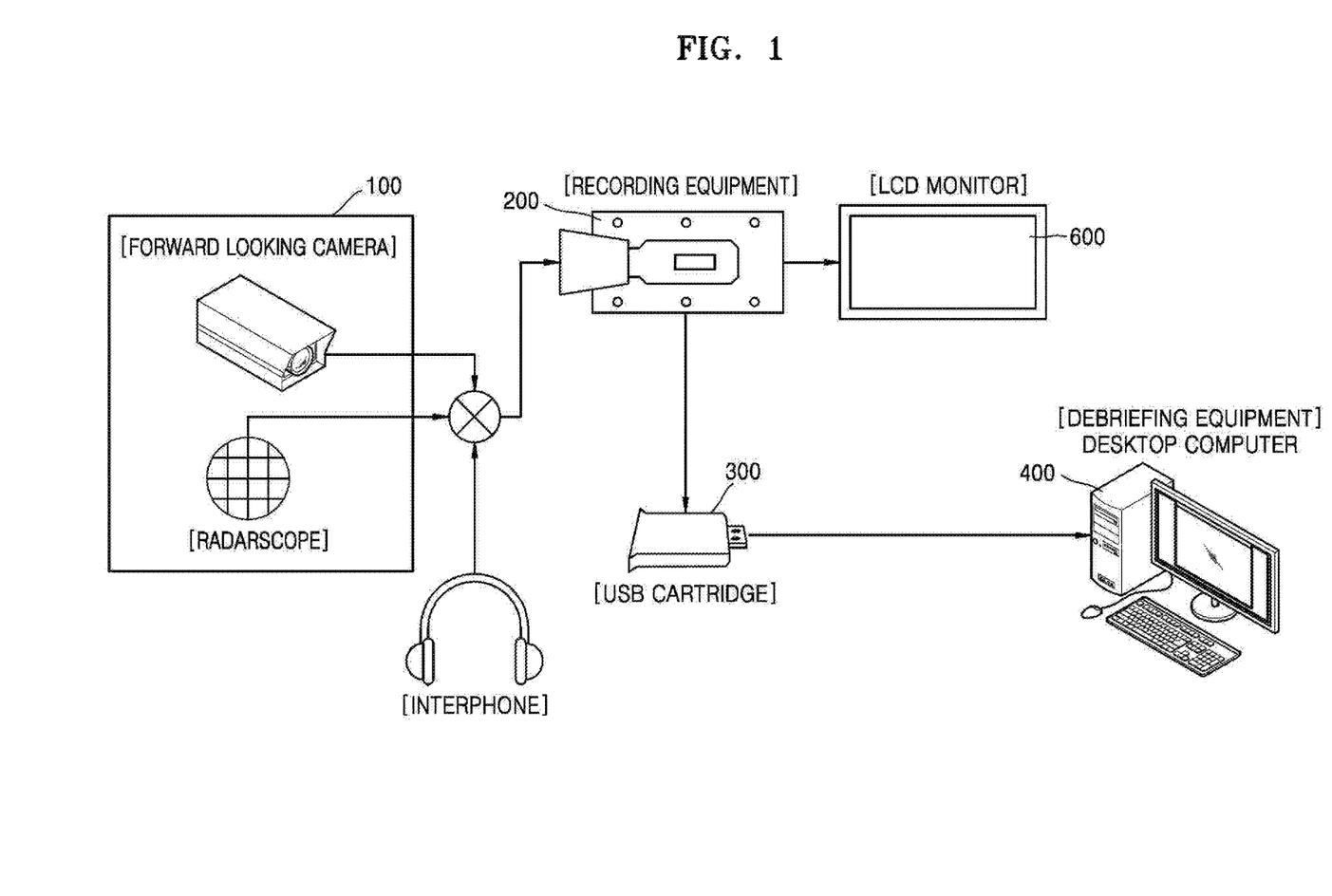
FIG. 1 is a conceptual configuration diagram of an aviation information storage system for an aircraft according to one embodiment of the present disclosure.
Figure 2:
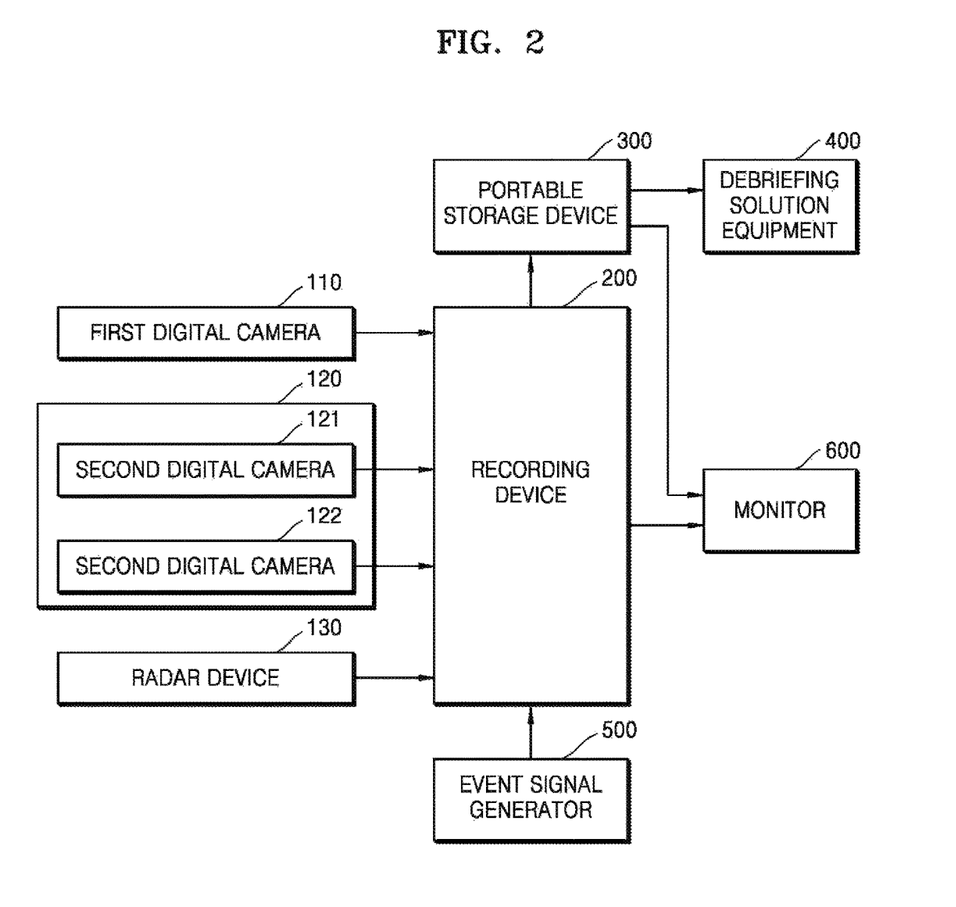
FIG. 2 is a block diagram illustrating an overall configuration of the aviation information storage system for the aircraft according to one embodiment of the present disclosure.

FIG. 1 is a conceptual configuration diagram of the aviation information storage system for the aircraft according to one embodiment of the present invention, and FIG. 2 is a block diagram illustrating an overall configuration the aviation information storage system for the aircraft according to one embodiment of the present invention.

As shown in the drawings, the aviation information storage system according to one embodiment of the present invention includes one or more image obtaining device 100, a recording device 200, and a portable storage device 300 to be mounted in the aircraft. Also, the aviation information storage system for the aircraft according to one embodiment of the present invention may further include an event signal generator 500, a monitor 600, and debriefing solution equipment 400 to be mounted in the aircraft.

The image obtaining device 100 is mounted in the aircraft and obtains images of surroundings and inside of the corresponding aircraft. That is, the image obtaining device 100 may be a digital camera and a radar device, may be embodied as a plurality of digital cameras installed inside or outside the aircraft, or may be embodied as one or a plurality of digital cameras and one radar device installed respectively. Describing based on the embodiment, the image obtaining device 100 includes a digital camera 110 installed in front of the cockpit of the aircraft to take forward images of the aircraft that is flying, two or more second digital cameras 120 installed in the rear of the cockpit of the aircraft to take images of an instrument panel of the aircraft and surroundings thereof, and a radar device 130.

Figure 3A:
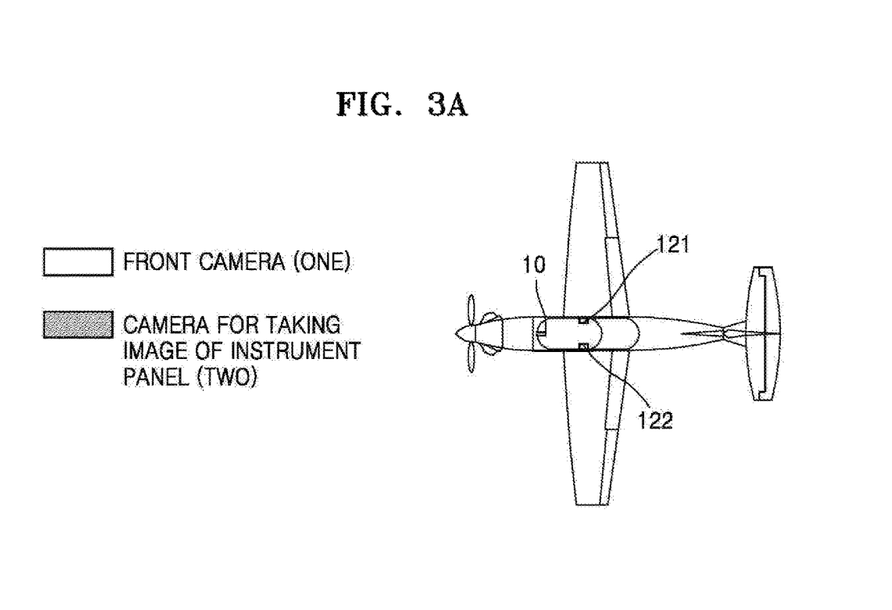
FIG. 3 is a view illustrating an example of installing an image obtaining device in the aircraft in the aviation information storage system for the aircraft according to one embodiment of the present invention.
Figure 3B:
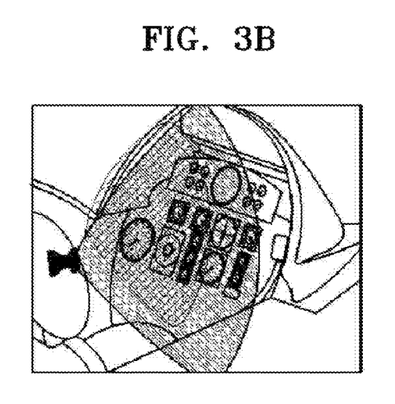
Figure 3C:
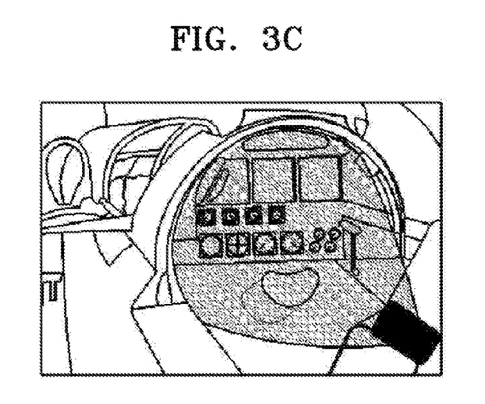

Referring to FIG. 3, FIG. 3 is a view illustrating an example of installing the image obtaining device 100 in the aircraft in the aviation information storage system for the aircraft according to one embodiment of the present invention.

As shown in FIG. 3(a), the first digital camera 110 is installed in front of the cockpit of the aircraft and the second digital cameras 120 are installed inside the cockpit of the aircraft to take images of the instrument panel of the aircraft. FIGS. 3(a) and 3(b) illustrate states of taking images of the instrument panel of the aircraft through the second digital cameras 120.

Referring to FIGS. 1 and 2 again, the recording device 200 records images obtained through the image obtaining device 100 during a flying process of the aircraft. Also, in the embodiment, a storage device of the recording device 200 is a secure digital (SD) card as an example but the present invention is not limited thereto.

The portable storage device 300 performs a function of synchronously storing image data recorded at the recording device 200. The image data stored in the portable storage device 300 may be regenerated through the monitor 600 in the aircraft and simultaneously be moved to a control center to be regenerated through the debriefing solution equipment 400 only for the control center. Due to the portable storage device 300 described above, even though an abnormality occurs in a storage device of the recording device 200 and the stored image data is lost, the same image data stored in the portable storage device 300 may be used. Accordingly, it is possible to more stably provide and protect the image data during the flying process of the aircraft.

Also, in the embodiment, the portable storage device 300 is a universal serial bus (USB) cartridge as an example but the present invention is not limited thereto.

When an event situation is generated by operating the instrument panel during the flying process of the aircraft, the event signal generator 500 is connected to an equipment piece of the instrument panel that generates the corresponding event for each event and generates a trigger signal.

Also, the trigger signal generated at the signal generator 500 as described above is transmitted to the recording device 200 and the recording device 200 generates data related to the corresponding event and then synchronizes the event-related data generated as described above with a corresponding event image. As described above, as the recording device 200 synchronizes the event image with the event-related data connected thereto, the event-related data is displayed with a certain area of the corresponding event image during a process of regenerating the corresponding event image after recording at the recording device 200 or a process of displaying in real time through the monitor 600 in the aircraft.

Describing based on the embodiment, the aircraft is a military aircraft and the event signal generator is a component connected to offensive military equipment of the aircraft to generate a trigger signal when operating the corresponding offensive military equipment. Also, the event-related data generated at the recording device 200 is data that displays an operation time of a pilot with respect to the corresponding offensive military equipment in a corresponding operation based on one time operation of the offensive military equipment when the offensive military equipment operates.

Accordingly, when a pilot of a military aircraft generates an event situation such as firing of a machine gun or a missile and the like, an operation of the pilot with respect to the instrument panel for a corresponding event during this process is obtained as an image in real time and simultaneously an operation time with respect to the instrument panel for each time of firing of the machine gun and a time for pulling a missile switch for firing the missile and the like are displayed in an image of the pilot operating the instrument panel in ms (1/1000 second). Also, through this, it is possible to more precisely analyze a skill level, an instantaneous response operation and the like of the pilot by comparing with previous corresponding images. Through this analyzing, it is possible to precisely recognize improvement levels of the skill level and the instantaneous response operation and simultaneously to utilize the same as training materials to increase learning efficiency of flying training.

Also, when a trigger signal is input from the event signal generator 500, the recording device 200 may insert a beginning code and a completion code into an image obtained during a preset time for each type of the trigger signal. Also, the recording device 200 may further store an event image distinguished through the beginning code and the completion code as a separate file. Accordingly, a pilot who is receiving flying training, a trainer, and training officials may more easily and precisely recognize an advancement rate, a flying skill level and the like of the pilot by checking the separately stored event image as described, which causes an increase in efficiency of flying training.

Also, the recording device 200 may include a recording program capable of dividedly displaying images obtained through two or more image obtaining devices 110 to 130 and transmitted at the same time on one screen and simultaneously displaying only one selected image on an overall screen as necessary. Also, the recording device 200 may include a regeneration program capable of displaying one image selected from the images dividedly displayed on one screen as described above on an overall screen.

Accordingly, since images each obtained through the image obtaining device 100 may be basically displayed on one screen while being divided and simultaneously only a necessary image may be displayed as necessary while being enlarged as an overall screen, total images obtained through a flying process of the aircraft may be checked in batches and only a certain image may be enlarged and checked as necessary.

For example, images obtained for each of the image obtaining devices 110 to 130 during the flying process of the aircraft may be checked in batches and event-related images may be enlarged as an overall screen to be checked one by one as necessary.

Lastly, the monitor 600 is installed inside the aircraft and displays an image obtained by the image obtaining device 100. Here, the monitor 600 is connected to a connection line of the image obtaining device 100 and the recording device 200 in parallel and regenerates an image obtained by the image obtaining device 100 in real time. Also, the monitor 600 performs a function of regenerating image data stored in the recording device 200 or the portable storage device 300.

Next, referring to FIGS. 4 to 7, a method of storing aviation information for an aircraft according to one embodiment of the present invention will be described.

Before a description, the aviation information storage system shown in FIGS. 1 to 3 is used as an aviation information storage system in the embodiment. Accordingly, it should be notified that corresponding components will be referred to as the same reference numerals used for the aviation information storage system shown in FIGS. 1 to 3 in the following description.

Figure 4:
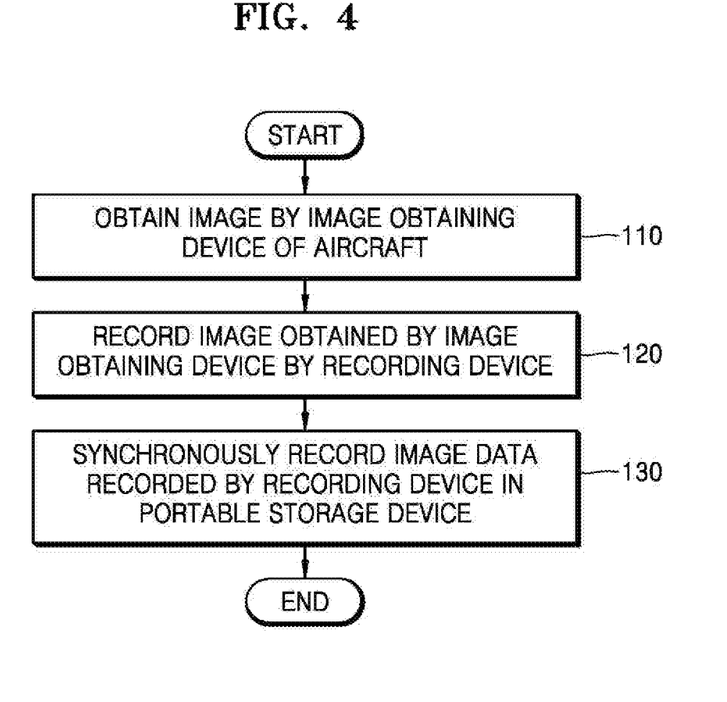
FIG. 4 is a flowchart illustrating a method of storing aviation information for an aircraft according to one embodiment of the present invention.

FIG. 4 is a flowchart illustrating the method of storing aviation information for the aircraft according to one embodiment of the present invention.

As shown in the drawing, in operation (S110), images are obtained for each of the image obtaining devices 110 to 130 mounted in the aircraft during flying of the aircraft.

In operation (S120), the images obtained for each of the image obtaining devices 110 to 130 are recorded by the recording device 200.

In operation (S130), image data recorded by the recording device 200 in operation (S120) are stored in the portable storage device 300 at the same time.

Also, operation (S110) may include an operation of inserting a beginning code and a completion code into an image obtained for a preset time by the recording device 200 when a trigger signal is input from the event signal generator 500. Accordingly, operation (S120) may include an operation of storing an event image distinguished according to the beginning code and the completion code as a separate file.

Figure 5:
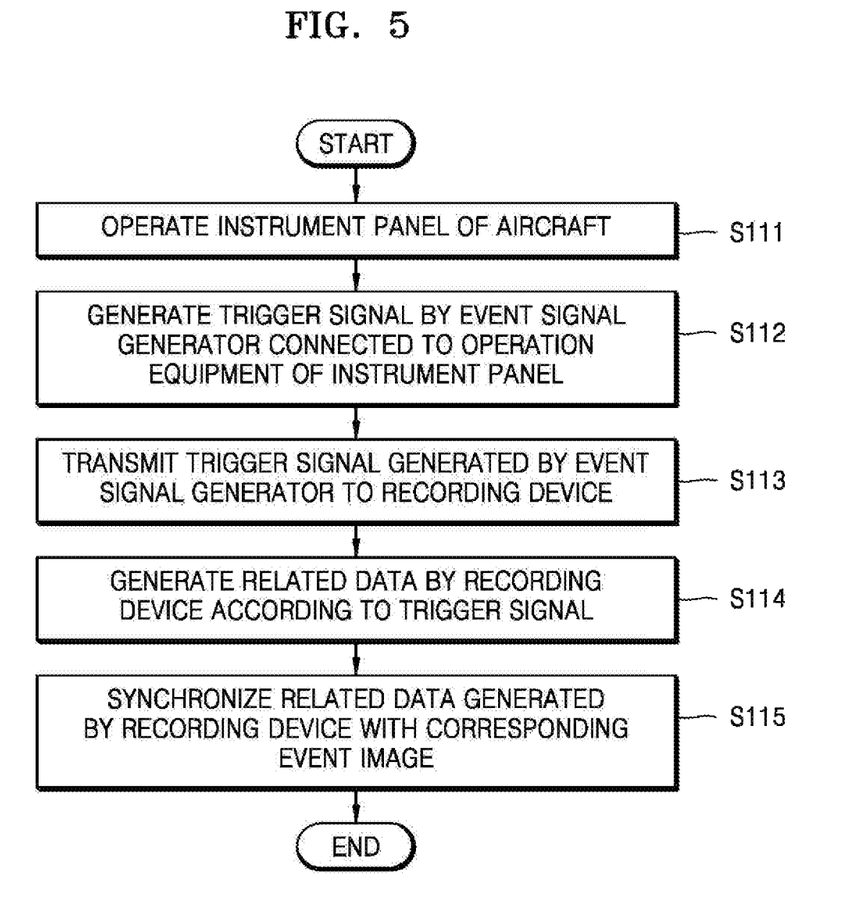
FIGS. 5 to 7 are flowcharts illustrating main detailed operations included each operation of the method of storing aviation information for the aircraft according to one embodiment of the present invention.

Also, FIG. 5 is a flowchart illustrating main detailed operations further included in operation (S110) of FIG. 4.

As shown in the drawing, in operation (S111), an event situation is generated by operating the instrument panel of the aircraft.

In operation (S112), the event signal generator 500 connected to operation equipments of the instrument panel generates a trigger signal corresponding to each of the operation equipments of the instrument panel.

In operation (S113), the event signal generator 500 transmits the generated trigger signal to the recording device 200.

In operation (S114), the recording device 200 generates data related to a corresponding event according to receiving of the trigger signal.

In operation (S115), the recording device 200 synchronizes the generated event-related data with a corresponding event image to record together.

Figure 6:
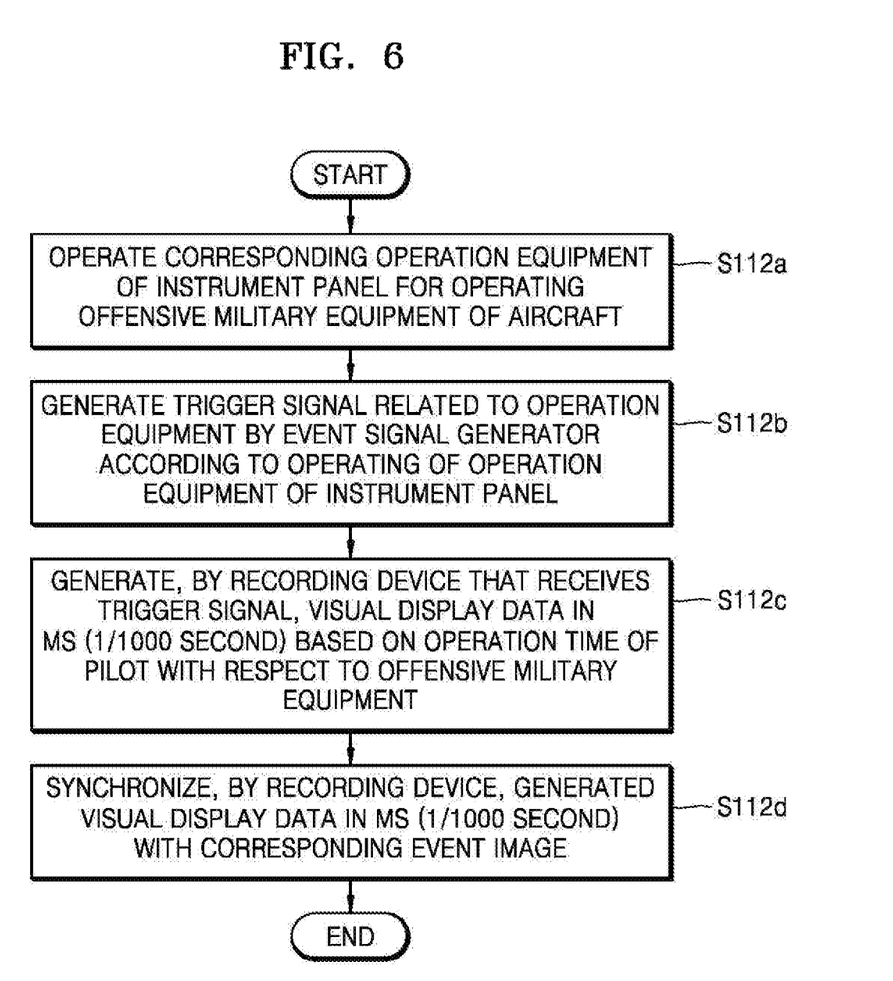

Also, FIG. 6 is a flowchart illustrating main detailed operations further included in operation (S112) of FIG. 5.

As shown in the drawing, in operation (S112a), to allow offensive military equipment of a fighter plane that is the aircraft to perform an offensive function, corresponding operation equipment of the instrument panel of the corresponding aircraft is operated.

In operation (S112b), according to operating of the operation equipment of the instrument panel for operating the offensive military equipment of the aircraft, a trigger signal is generated from the event signal generator 500 connected to the corresponding operation equipment.

In operation (S112c), the recording device 200 that receives the trigger signal generates data for visual display in ms (1/1000 second) based on an operation time of a pilot with respect to the corresponding offensive military equipment based on one operation of the offensive military equipment.

In operation (S112d), the recording device 200 synchronizes the generated data for visual display in ms (1/1000 second) with a corresponding event image.

Figure 7:
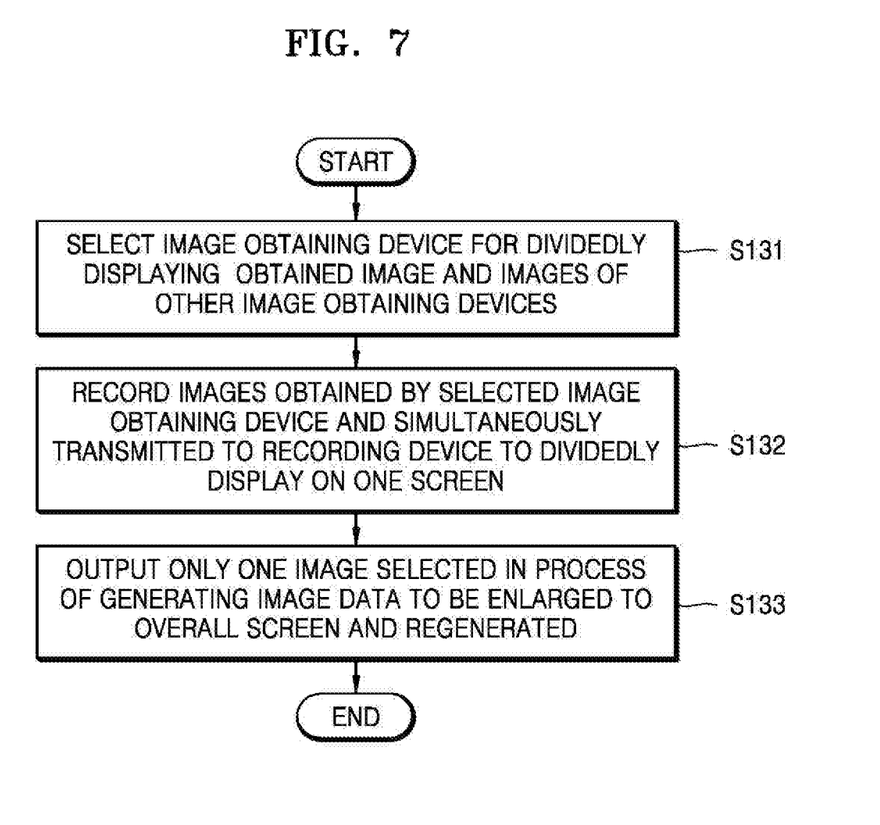

Also, FIG. 7 is a flowchart illustrating main detailed operations further included in operation (S112) of FIG. 4.

As shown in the drawing, in operation (S131), an image obtaining device for separately displaying an obtained image from an image of another image obtaining device is selected from the image obtaining devices 110 to 130.

In operation (S132), images obtained by the image obtaining device selected from the image obtaining devices 110 to 130 and transmitted to the recording device 200 at the same time may be recorded to be dividedly displayed on one screen.

In operation (S133), image data recorded to be dividedly displayed on one screen are output to allow only one image selected during a regeneration process to be output while being enlarged as an overall screen.

As known from the embodiments of FIGS. 1 to 7 described above, the aviation information storage system for the aircraft and the method of operating the same according to the present invention may dually recording various pieces of information generated during an operation process of the aircraft and simultaneously the pieces of information recorded as described above may be directly checked through exclusive debriefing solution equipment. Accordingly, a function of securing the various pieces of information generated during the operation process of the aircraft increases and simultaneously stability of stored information may be maximized. Through this, a black box system with an excellent data protection function may be provided to the aircraft and simultaneously a flying training system for not only pilots of military type fighter planes but also pilots for operating various types of aircrafts such as cargo planes, passenger airplanes and the like may be provided.

Also, when an event situation such as firing of a machine gun, a missile and the like occurs during a flying process, image information of a corresponding event process is stored as a separate image file and simultaneously related data based on an operation of devices of the aircraft and body motions of a pilot for a corresponding event are synchronized with the separately stored image file and stored to be displayed on one screen in regeneration thereof and used as materials necessary for flying training to increase effects of the flying training.

For example, in case of fighter planes, a machine gun operation time, a missile switch pulling time and the like for each firing of a machine gun or missile may be displayed in ms (1/1000 second) over an image of the event image data and may be used as materials for improving a skill level, an instantaneous response operation and the like of a pilot to increase efficiency of flying training.

Also, when an event situation such as firing of a machine gun, a missile and the like occurs during a flying process of an aircraft, body motions for a corresponding event in this process are obtained as images in real time and the images obtained as described above are displayed in real time in at least one place of the inside of the aircraft and a control center to be directly utilized for flying training of the corresponding flying.

Also, a forward image, a radar image, other directional images in addition to the front, and an internal image of a cockpit of an aircraft that occur during an operation process of the aircraft may be integrated into one image to be stored and simultaneously the number of types of images capable of being integrated and stored in one image is selected, that is, the number of types of images that will be integrated and stored is preset before the beginning of flying in such a way that image data may be efficiently obtained and simultaneously stored during a flying process.

As described above, throughout the description, particular features such as detailed components and the like and limited embodiments of the present invention have been described with reference to the drawings to provide more general understandings of the present invention. However, the present invention is not limited the above embodiments and may be variously changed and modified by one of ordinary skill in the art from the above description.

Accordingly, the concept of the present invention should not be limited to the embodiments described above and the scope of the present invention should be defined by the following claims and include equivalents and modifications thereof.

INDUSTRIAL APPLICABILITY

The present invention may be extensively applied to the field of aviation systems.

The invention claimed is:

1. An aviation information storage system for an aircraft, comprising:
one or more image obtaining devices mounted in the aircraft;
an image recorder configured to record images obtained through the image obtaining devices during a flying process of the aircraft;
a portable storage device configured to synchronously store image data recorded by the image recorder, and coupled to the image recorder and a debriefing solution equipment to dually store the image data and to instantaneously check the stored image data through the debriefing solution equipment mounted in the aircraft; and
an event signal generator connected to pieces of equipment of an instrument panel that generates an event and configured to generate a trigger signal in response to a corresponding piece of equipment being operated by a pilot during a flying process of the aircraft,
wherein the one or more image obtaining devices are configured to obtain body motions of the pilot for a corresponding event as images,
wherein the image recorder is further configured to:
insert a beginning code and a completion code into an image obtained for a preset time upon receiving the trigger signal,
store an event image distinguished by the beginning and completion codes as a separate image file,
generate data related to a corresponding event based on an operation of the instrument panel and the body motions of the pilot upon receiving the trigger signal from the event signal generator, and
synchronize the generated data with the separately stored image file to record together, and
wherein the image data stored in the portable storage device are simultaneously moved to the debriefing solution equipment and a monitor in the aircraft to be regenerated respectively through the debriefing solution equipment and the monitor.

2. The system of claim 1, wherein the portable storage device is a universal serial bus (USB) cartridge.

3. The system of claim 1, wherein the one or more image obtaining devices comprise a digital camera and a radar device.

4. The system of claim 3, wherein the digital camera comprises a first digital camera installed in front of a cockpit of the aircraft to take an image of the front of the aircraft that is flying and two or more digital cameras installed in the rear of the cockpit of the aircraft to take images of the instrument panel of the aircraft and surroundings of the instrument panel.

5. The system of claim 1, wherein when the aircraft is a military aircraft, the event signal generator is connected to offensive military equipment of the aircraft to generate the trigger signal when the corresponding offensive military equipment is operated,
wherein the event comprises firing of a machine gun or a missile, and
wherein the image recorder generates the event-related data that displays the operation time of the pilot with respect to the corresponding offensive military equipment in a corresponding operation in ms ($1/1000$ second) when the offensive military equipment is operated.

6. The system of claim 1, wherein the monitor in the aircraft is further coupled to the image recorder.

7. An aviation information storage system for an aircraft, comprising:
one or more image obtaining devices mounted in the aircraft;
an image recorder configured to record images obtained by the image obtaining devices during a flying process of the aircraft;
a portable storage device configured to synchronously store image data recorded by the image recorder, and coupled to the image recorder and a debriefing solution equipment to dually store the image data and to instantaneously check the stored image data through the debriefing solution equipment mounted in the aircraft; and
an event signal generator connected to pieces of equipment of an instrument panel and configured to generate a trigger signal in response to an offensive military function being performed by a pilot by operating a corresponding piece of equipment of instrument panel of the aircraft that generates an event,
wherein the one or more image obtaining devices are configured to obtain body motions of the pilot for a corresponding event as images,
wherein the image recorder is configured to:
insert a beginning code and a completion code into an image obtained for a preset time upon receiving the trigger signal,
store an event image distinguished by the beginning and completion codes as a separate image file,
generate data related to a corresponding event based on an operation of the instrument panel and the body motions of the pilot upon receiving the trigger signal,
synchronize the generated data with the separately stored image file to record together,
wherein the image recorder comprises a recording program capable of dividedly displaying images obtained through two or more image obtaining devices on one screen and simultaneously displaying only one selected image on an overall screen as necessary, and
wherein the image recorder further comprises a regeneration program capable of displaying one image selected from the images dividedly displayed on one screen on the overall screen.

8. An aviation information storage system for an aircraft, comprising:
one or more image obtaining devices mounted in the aircraft;
an image recorder configured to record images obtained by the image obtaining devices during a flying process of the aircraft;
a portable storage device coupled to the image recorder and a debriefing solution equipment, and configured to synchronously store image data recorded by the image recorder to dually store the image data and to instantaneously check the stored image data through the debriefing solution equipment mounted in the aircraft;
an event signal generator connected to pieces of equipment of an instrument panel and configured to generate a trigger signal in response to an offensive military function being performed by a pilot by operating a corresponding piece of equipment of instrument panel of the aircraft that generates an event, and
a monitor installed inside the aircraft to display the images obtained by the image obtaining devices,
wherein the image recorder is configured to:
insert a beginning code and a completion code into an image obtained for a preset time upon receiving the trigger signal,
store an event image distinguished by the beginning and completion codes as a separate image file,
generate data related to a corresponding event based on an operation of the instrument panel and body motions of the pilot obtained by the one or more image obtaining devices as images upon receiving the trigger signal,
synchronize the generated data with the separately stored image file to record together,
wherein the monitor is connected to an electrical connection line of the image obtaining devices and the image recorder in parallel and includes a function of regenerating the images obtained by the image obtaining devices in real time or a function of regenerating the image data stored in the image recorder or in the portable storage device, and
wherein the image data stored in the portable storage device are simultaneously moved to the debriefing solution equipment and the monitor in the aircraft to be regenerated respectively through the debriefing solution equipment and the monitor.

9. A method of storing aviation information for an aircraft, the method comprising:
obtaining images, by image obtaining devices mounted in the aircraft, while the aircraft is flying;
recording, by an image recorder, the images obtained for each of the image obtaining devices; and
synchronously storing image data recorded by the image recorder in a portable storage device coupled to the image recorder, a monitor, and a debriefing solution equipment to dually store the image data and to instantaneously check the stored image data through the debriefing solution equipment mounted in the aircraft,
wherein the image data stored in the portable storage device are simultaneously moved to the debriefing solution equipment and the monitor in the aircraft to be regenerated respectively through the debriefing solution equipment and the monitor, and
wherein the obtaining of the images by the image obtaining devices mounted in the aircraft comprises:
generating and transmitting, by an event signal generator connected to pieces of equipment of an instrument panel of the aircraft in response to an offensive military function being performed by a pilot by operating a corresponding piece of equipment of instrument panel, a trigger signal for each of the pieces of equipment of the instrument panel that generates an event, to the image recorder;
inserting, by the image recorder, a beginning code and a completion code into an image obtained for a preset time upon receiving the trigger signal;
storing, by the image recorder, an event image distinguished by the beginning and completion codes as a separate image file;
generating, by the image recorder, data related to a corresponding event based on an operation of the instrument panel and body motions of the pilot obtained by the image obtaining devices as images upon receiving the trigger signal; and
synchronizing, by the image recorder, the generated data with the separately stored image file to record together.

10. The method of claim 9, wherein the generating and transmitting, by the event signal generator connected to the pieces of equipment of the instrument panel of the aircraft when the event situation is generated by operating the instrument panel, the trigger signal for each of the pieces of equipment of the instrument panel that generates the event to the image recorder comprises:
operating the corresponding piece of equipment of the instrument panel to perform an offensive military function of offensive military equipment of the aircraft that is a fighter plane;
generating, by the event signal generator connected to the corresponding piece of equipment, the trigger signal when operating the corresponding piece of equipment of the instrument panel for operating the offensive military equipment;
generating, by the image recorder that receives the trigger signal, data for visually displaying an operation time of the pilot with respect to a corresponding offensive military equipment in ms ($1/1000$ second) based on one time operation of the corresponding offensive military equipment; and
synchronizing the data for visually displaying in ms ($1/1000$ second), generated by the image recorder, with a corresponding event image to transmit to the image recorder.

11. A method of storing aviation information for an aircraft, the method comprising:
obtaining images, by each of image obtaining devices mounted in the aircraft, while the aircraft is flying;
recording, by an image recorder, the images obtained by each of the image obtaining devices;
synchronously storing image data recorded by the image recorder in a portable storage device coupled to the image recorder and a debriefing solution equipment to dually store the image data and to instantaneously check the stored image data through the debriefing solution equipment mounted in the aircraft;
generating, by an event signal generator connected to pieces of equipment of an instrument panel that generates an event, a trigger signal in response to an event situation being generated by operating a corresponding piece of equipment of instrument panel by a pilot during a flying process of the aircraft;
inserting, by the image recorder, a beginning code and a completion code into an image obtained for a preset time upon receiving the trigger signal;

storing, by the image recorder, an event image distinguished by the beginning and completion codes as a separate image file;
generating, by the image recorder, data related to a corresponding event based on an operation of the instrument panel and body motions of the pilot obtained by the image obtaining devices as images upon receiving the trigger signal; and
synchronizing, by the image recorder, the generated data with the separately stored image file to record together,
wherein the image data stored in the portable storage device are simultaneously moved to the debriefing solution equipment and a monitor in the aircraft to be regenerated respectively through the debriefing solution equipment and the monitor, and
wherein the recording of the images obtained by each of the image obtaining devices comprises:
  selecting one image obtaining device among the image obtaining devices to dividedly display the obtained images with images of the other image obtaining devices;
  recording images obtained by the selected image obtaining device among the image obtaining devices and simultaneously transmitted to the image recorder to be dividedly displayed in one screen; and
  outputting the recorded images to be dividedly displayed based on one screen by the image recorder to regenerate only one image selected during a regeneration process while being enlarged to an overall screen.

* * * * *